(12) United States Patent
Hashizume et al.

(10) Patent No.: US 8,657,331 B2
(45) Date of Patent: Feb. 25, 2014

(54) AIRBAG DEVICE

(75) Inventors: Tomoki Hashizume, Settsu (JP); Yuta Minami, Settsu (JP); Miwa Matsuoka, Settsu (JP)

(73) Assignee: Ashimori Industry Co., Ltd., Osaka (JP)

( * ) Notice: Subject to any disclaimer, the term of this patent is extended or adjusted under 35 U.S.C. 154(b) by 0 days.

(21) Appl. No.: 13/989,576

(22) PCT Filed: Oct. 31, 2011

(86) PCT No.: PCT/JP2011/075061
§ 371 (c)(1),
(2), (4) Date: Jun. 11, 2013

(87) PCT Pub. No.: WO2012/070362
PCT Pub. Date: May 31, 2012

(65) Prior Publication Data
US 2013/0249194 A1    Sep. 26, 2013

(30) Foreign Application Priority Data
Nov. 25, 2010 (JP) ................................. 2010-262789

(51) Int. Cl.
B60R 21/20  (2011.01)
(52) U.S. Cl.
USPC .................................... 280/730.2; 280/728.2
(58) Field of Classification Search
USPC ........................................... 280/728.2, 730.2
See application file for complete search history.

(56) References Cited

U.S. PATENT DOCUMENTS

| 5,791,683 | A | * | 8/1998 | Shibata et al. | 280/730.2 |
|---|---|---|---|---|---|
| 6,279,941 | B1 | * | 8/2001 | Nakajima et al. | 280/728.2 |
| 7,832,064 | B2 | * | 11/2010 | Nessel et al. | 24/297 |
| 7,862,075 | B2 | * | 1/2011 | Minamikawa | 280/730.1 |
| 8,091,918 | B2 | * | 1/2012 | Mitchell et al. | 280/728.2 |
| 8,220,825 | B2 | * | 7/2012 | Bonarens et al. | 280/728.2 |
| 2003/0042712 | A1 | * | 3/2003 | Henderson et al. | 280/728.2 |
| 2003/0222435 | A1 | * | 12/2003 | Schmidt et al. | 280/728.2 |
| 2005/0029778 | A1 | * | 2/2005 | Weber et al. | 280/728.2 |
| 2006/0091647 | A1 | | 5/2006 | Kawabe et al. | |

FOREIGN PATENT DOCUMENTS

| JP | 2000-142302 A | 5/2000 |
|---|---|---|
| JP | 2000-247203 A | 9/2000 |
| JP | 2006-117110 A | 5/2006 |
| JP | 2009-220646 A | 10/2009 |

OTHER PUBLICATIONS

International Search Report of PCT/JP2011/075061 dated Jan. 24, 2012.

* cited by examiner

Primary Examiner — Toan To
(74) Attorney, Agent, or Firm — Sughrue Mion, PLLC (57) ABSTRACT

In an airbag device to be mounted to a vehicle-body side wall, an airbag and a mounting bracket are temporarily, but securely, attached to each other, so that mounting of the airbag to the vehicle-body side wall can be easily performed.
A bolt (50) is inserted through a plurality of mounting tabs (11) provided on an airbag (10) of an airbag device (1), a mounting bracket (40) having inner and outer plates (41) and (42), and an annular member (44) provided in the inner plate (41). In this state, a toothed washer (70) is fitted and temporarily attached to the bolt (50). The annular member (44) is fastened by screwing the bolt (50) into a nut (55) attached to the vehicle-body side wall (15) when the airbag (10) is mounted to a vehicle-body side wall (15).

5 Claims, 7 Drawing Sheets

PRIOR ART

FIG. 6

PRIOR ART

AIRBAG DEVICE

CROSS REFERENCE TO RELATED APPLICATIONS

This is a National Stage of International Application No. PCT/JP2011/075061 filed Oct. 31, 2011, claiming priority based on Japanese Patent Application No. 2010-262789 filed Nov. 25, 2010, the contents of all of which are incorporated herein by reference in their entirety.

TECHNICAL FIELD

The present invention relates to airbag devices to be mounted to vehicle-body side walls and to be inflated and deployed in vehicles, and more specifically, it relates to an airbag device that has mounting brackets for mounting an airbag to a vehicle-body side wall.

BACKGROUND ART

Airbag devices that are inflated and deployed downward along vehicle-body side walls, like curtains (curtain airbag devices), to protect the heads of occupants in front seats and rear seats in an emergency stop of a vehicle, such as collision, have become common. Because such an airbag device is laterally longer than conventional airbag devices stored in, for example, steering wheels and instrument panels, the airbag is provided with a plurality of mounting tabs protruding from the airbag at an upper part thereof, corresponding to the lateral length thereof, via which the airbag is mounted to a vehicle-body side wall (for example, a roof-side rail).

Because these mounting tabs are subjected to a considerable tensile force when the airbag is inflated and deployed, one end of each mounting tab needs to be securely fixed to a vehicle-body side wall (for example, a roof-side rail) with a bolt etc., so that the mounting tabs of the airbag are not detached from mounting means (mounting brackets) when the airbag is inflated and deployed. Airbag devices having mounting structures for this purpose have already been proposed.

For example, there is known an airbag device in which a mounting tab provided so as to protrude from an airbag is sandwiched between two metal plates, and the airbag is mounted to a vehicle-body side wall in this state (PTL 1).

In this airbag device, the airbag is fixed by crimping the two metal plates together to integrate the metal plates and the mounting portion (the mounting tab), inserting a bolt into mounting holes provided in the mounting portion and the metal plate, and screwing the bolt into a fixing hole provided in an inner panel (a vehicle-body side wall) and a nut welded to the inner panel.

Furthermore, separately from the above airbag device, there is known an airbag device in which an edge (a mounting tab) of an airbag body is sandwiched between a bent metal plate, and this metal plate is mounted to a roof-side frame (a vehicle-body side wall) of a vehicle with a bolt (PTL 2).

However, because the airbag device disclosed in PTL 1 has a structure in which the mounting portion (the mounting tab) of the airbag is sandwiched between the pair of metal plates, and in this state, the bolt is inserted through the metal plates, the mounting portion, and the inner panel and screwed into the nut, thereby integrally fastening these components, the mounting portion sandwiched between the pair of metal plates serves as a cushion when the bolt is fastened, making it difficult to obtain a feeling of contact when the bolt is fastened. Hence, it is difficult to fasten the bolt with a predetermined torque. In addition, when a state in which the mounting portion is compressed between the pair of metal plates lasts for a long time, the torque of the bolt may decrease due to thermal expansion and deterioration of the mounting portion (the mounting tab).

Also in the airbag device disclosed in PTL 2, because a bent back claw is pushed toward the plate by the vehicle-body side wall and compresses the edge (the mounting tab), the edge serves as a cushion, making it difficult to obtain a feeling of contact of the bolt. Furthermore, similarly to the airbag device disclosed in PTL 1, a decrease in torque due to aging may occur.

Meanwhile, to overcome these problems, there has been proposed an airbag device having a mounting bracket that is configured to sandwich a mounting tab portion (a mounting tab) of an airbag between outer and inner plate portions but that prevents the mounting tab portion from serving as a cushion, thereby making it possible to obtain a feeling of contact when a bolt is fastened (PTL 3).

Figure 5:
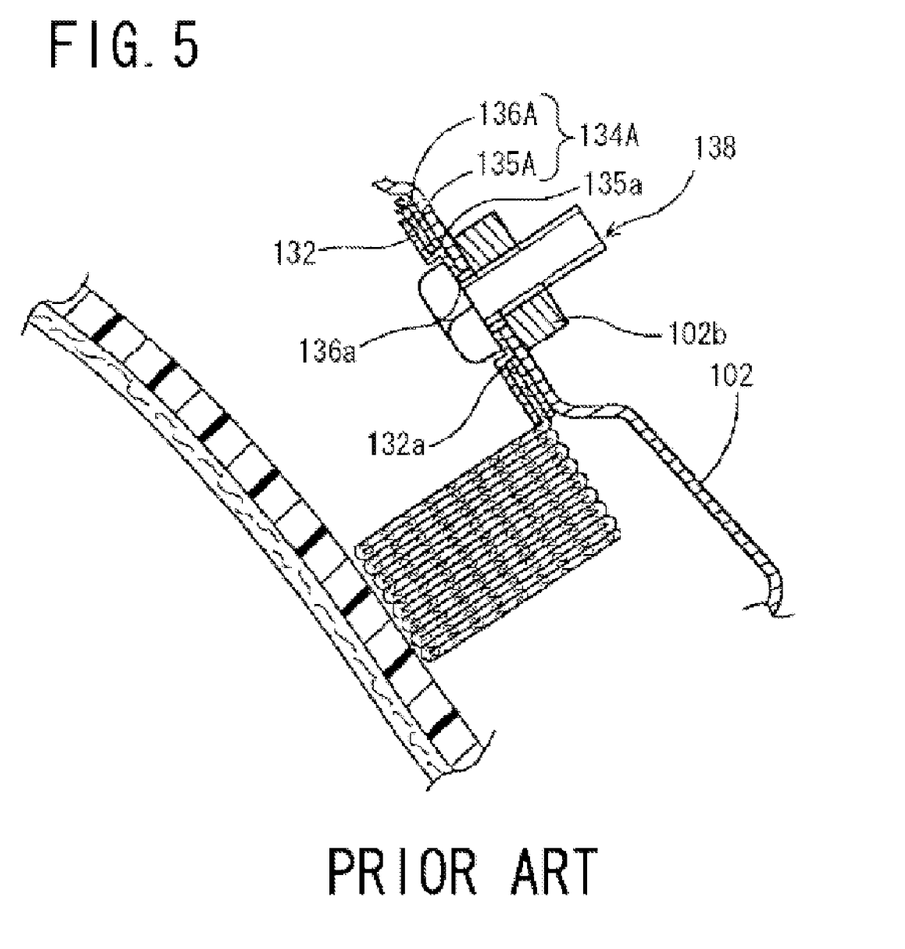
FIG. 5 is a cross-sectional view showing a mounting structure of a conventional airbag.

In this airbag, as shown in FIG. 5, a mounting bracket 134A is composed of inner and outer plate portions 136A and 135A, a peripheral edge portion of a mounting hole 136a in the inner plate portion 136A is provided so as to be substantially in flush with a vehicle-exterior-side surface of the outer plate portion 135A, and a mounting bolt 138, which is allowed to penetrate through an insertion hole 132a in a mounting tab portion 132 and a mounting hole 135a in the outer plate portion 135A and protrudes toward a vehicle exterior side, is screwed into a nut 102b attached to an inner panel 102.

Figure 6:
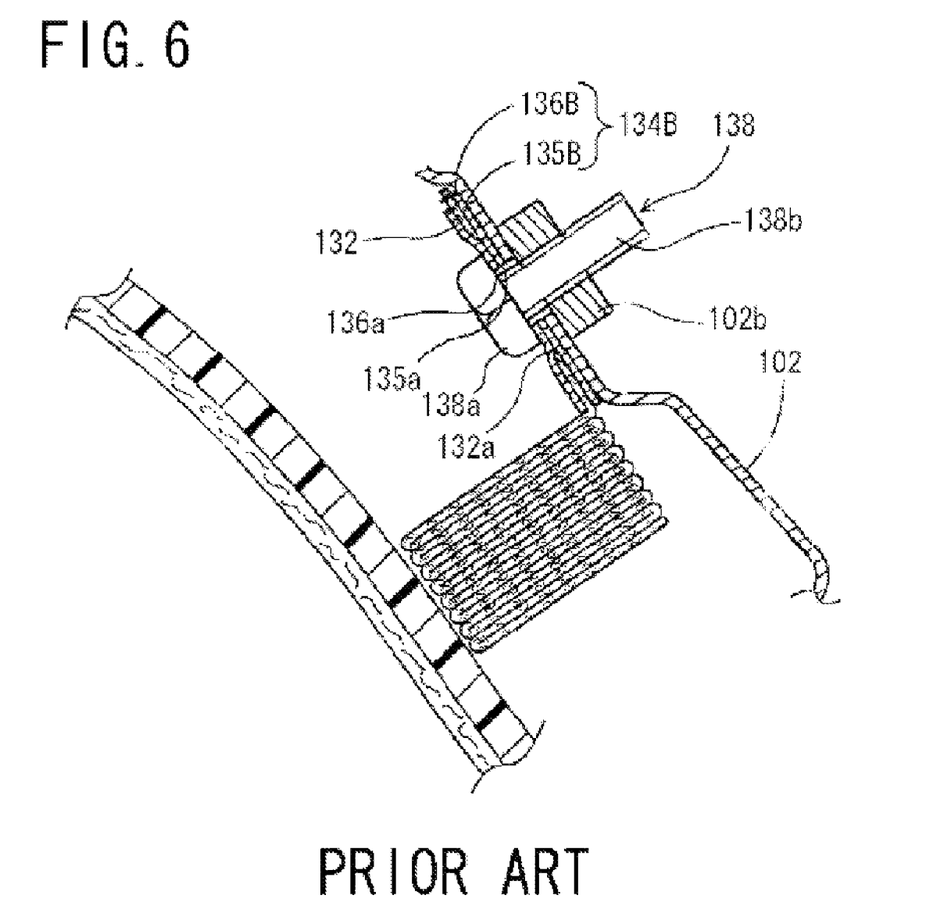
FIG. 6 is a cross-sectional view showing another mounting structure of the conventional airbag.

Furthermore, in a mounting bracket 134B shown in FIG. 6, the inside diameter of a mounting hole 136a in an inner plate portion 136B is set substantially the same as the inside diameter of a mounting hole 135a in an outer plate portion 135B. A head 138a of a mounting bolt 138 is abutted against the periphery of the mounting hole 136a in the inner plate portion 136B, and a fastening shaft 138b of the mounting bolt 138 is fastened to a nut 102b on an inner panel (a vehicle-body side wall) 102, thereby directly joining the inner and outer plate portions 136B and 135B.

With the mounting brackets 134A and 134B of the airbag device in PTL 3, it seems that the mounting tab portion 132 does not serve as a cushion, a feeling of contact is obtained when the mounting bolt 138 is fastened, and a decrease in torque after fastening does not occur.

However, with this airbag device, when the mounting tab portion 132 of the airbag is fixed to the inner panel 102, the inner plate portion 136A or 136B and the outer plate portion 135A or 135B have to be separately fitted and positioned with respect to the mounting tab portion 132 from the front and back. Furthermore, to integrate the mounting tab portion 132 and the outer plate portions 135A and 135B and the inner plate portions 136A and 136B in advance, portions to be deformed are provided in the outer plate portions 135A and 135B and the inner plate portions 136A and 136B, and the portions to be deformed are crimped. However, if the portions to be deformed are just crimped, they may come off during conveyance etc. Furthermore, when the airbag is mounted to the inner panel, the mounting bolt needs to be inserted into the mounting tab portion 132 and the outer plate portions 135A and 135B and the inner plate portions 136A and 136B. Thus, mounting work inevitably becomes complex.

Under the circumstances, there is a demand for an airbag device in which mounting of an airbag to a vehicle body is easy, a feeling of contact can be obtained when mounting tabs of the airbag are fastened with bolts, as in the conventional airbag device, and furthermore, the mounting work can be easily performed.

CITATION LIST

Patent Literature

PTL 1: Japanese Unexamined Patent Application, Publication No. 2000-247203
PTL 2: Japanese Unexamined Patent Application, Publication No. 2000-142302
PTL 3: Japanese Unexamined Patent Application, Publication No. 2006-117110

SUMMARY OF INVENTION

Technical Problem

The present invention has been made to overcome the above-described problems, and objects thereof are, in an airbag device to be mounted to a vehicle-body side wall, to enable a feeling of contact to be obtained when bolts are fastened and to enable the airbag and mounting brackets to be temporarily, but securely, attached to each other so that storage and conveyance, as well as mounting of the airbag to the vehicle-body side wall, can be easily performed.

Solution to Problem (1) The present invention is an airbag device to be disposed at an upper part inside a vehicle, along a front-rear direction of the vehicle, the airbag device including a plurality of mounting tabs that are provided on an airbag of the airbag device, each mounting tab having an insertion hole; a mounting bracket including inner and outer plates that have an insertion hole; an annular member that has a predetermined thickness and is to be disposed inside the insertion hole in the mounting tab; and a bolt and a nut, the bolt having a shaft portion penetrating through the inner hole in the annular member and the insertion hole in the inner and outer plates, the bolt serving to attach the mounting bracket to a vehicle-body side wall. The bolt is fitted to a toothed washer for temporary attachment, the toothed washer temporarily attaching the bolts to the mounting bracket to which the mounting tab is fitted. The annular member restricts the distance between the inner and outer plates to the predetermined thickness when the airbag is mounted to the vehicle-body side wall.
(2) The present invention is the airbag device according to (1) above, in which the inner hole and the insertion hole are formed in the shape of an elongated hole.
(3) The present invention is the airbag device according to (1) or (2) above, in which the annular member is formed integrally with the mounting bracket.
(4) The present invention is the airbag device according to (1) or (2) above, in which the annular member is formed separately from the mounting bracket.
(5) The present invention is the airbag device according to any one of (1) to (4) above, in which the annular member is a circular member.

Advantageous Effects of Invention

According to the present invention, when mounting the airbag, a feeling of contact can be obtained when the bolts are fastened. Furthermore, because the airbag and the mounting brackets are temporarily, but securely, attached to each other with the bolts and the toothed washers in advance, storage and conveyance thereof are easy. In addition, the bolts do not need to be inserted through the mounting brackets when mounted to the vehicle-body side wall, and thus, mounting can be easily performed.

BRIEF DESCRIPTION OF DRAWINGS

FIGS. 4A, 4B, and 4C show a mounting bracket according to an embodiment of the present invention, in which

DESCRIPTION OF EMBODIMENTS

Figure 1:
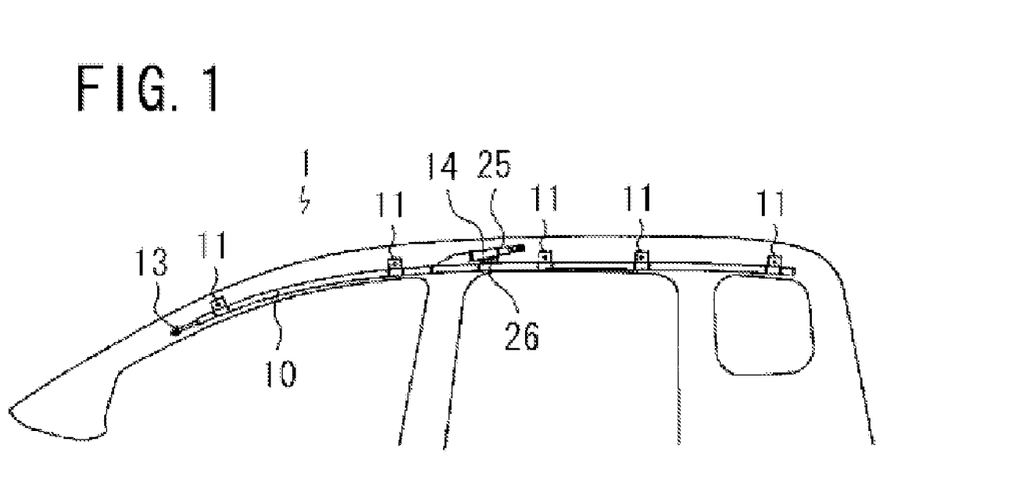
FIG. 1 is a cross-sectional view showing a vehicle interior, in which the position where an airbag is to be mounted is illustrated.
Figure 2:
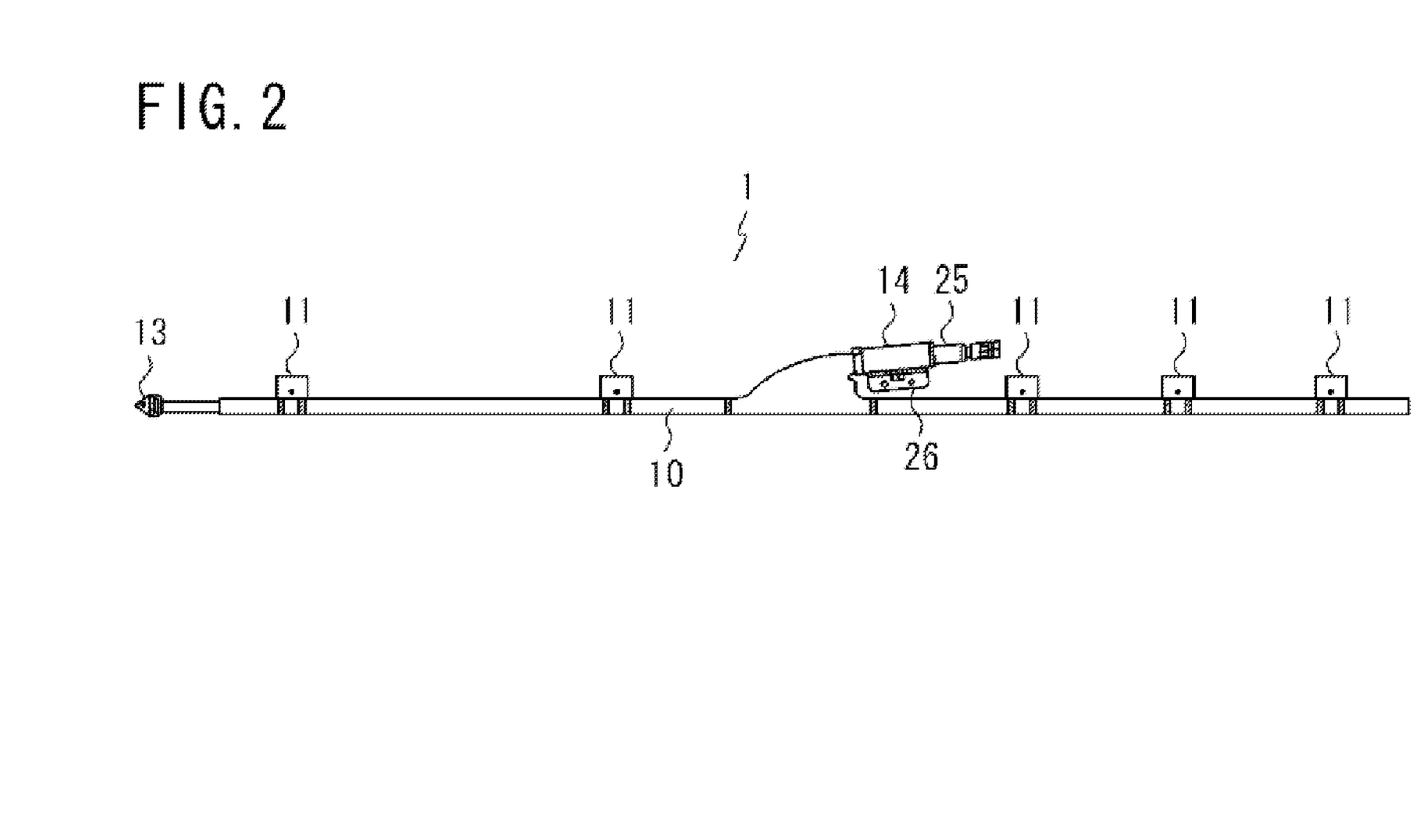
FIG. 2 is a side view of a stored airbag device.

An airbag device (a curtain airbag device) that is an embodiment of the airbag device of the present invention and is disposed at an upper part inside a vehicle along a front-rear direction of the vehicle will be described with reference to the attached drawings. FIG. 1 is a cross-sectional view showing a vehicle interior, in which the position where an airbag 10 is to be mounted is illustrated. FIG. 2 is a side view showing an airbag device 1 in a non-operating state, i.e., in a stored state.

The airbag device 1 is configured such that the airbag 10 is inflated by gas supplied from an inflator, due to an impact, such as a collision of the vehicle, and is deployed from a vehicle-body side wall downward, along the front-rear direction of the vehicle, like a curtain, thereby protecting mainly the head of a passenger.

In this airbag device 1, a plurality of mounting tabs 11 are provided along an upper edge of the airbag (or an airbag body) 10. As shown in FIG. 1, these mounting tabs 11 are attached to the vehicle-body side wall, e.g., a roof-side rail portion (not shown), via mounting brackets (described below), at an upper part of the vehicle body, along the front-rear direction of the vehicle body. In a non-operating state, the airbag 10 is folded in such a manner as to be capable of being inflated and deployed to the lower side of the vehicle and is stored in a storage portion, such as the inside of a trim part.

The airbag 10 in a stored state is formed in a laterally elongated bag shape corresponding to the shape of a window to be covered, in the vehicle-body side wall. The airbag device 1 has a gas inlet portion 14 substantially in the middle position thereof in the longitudinal direction.

The gas inlet portion 14 is formed in a tube shape and is open at the rear end with respect to the vehicle, by making a portion of base fabric protrude upward from an upper edge of the airbag 10 and joining it to an outer-peripheral joining portion of the airbag 10 in a continuous manner, along the edge thereof. In the airbag device 1, one end (a gas jet nozzle) of a tubular cylinder-type inflator 25 is inserted into the gas inlet portion 14 placed, for example, in a gas guide member, a gas rectification member, or the like, and then, they are all fixed to the vehicle-body side wall (the roof-side rail portion) using a bracket 26.

Figure 3:
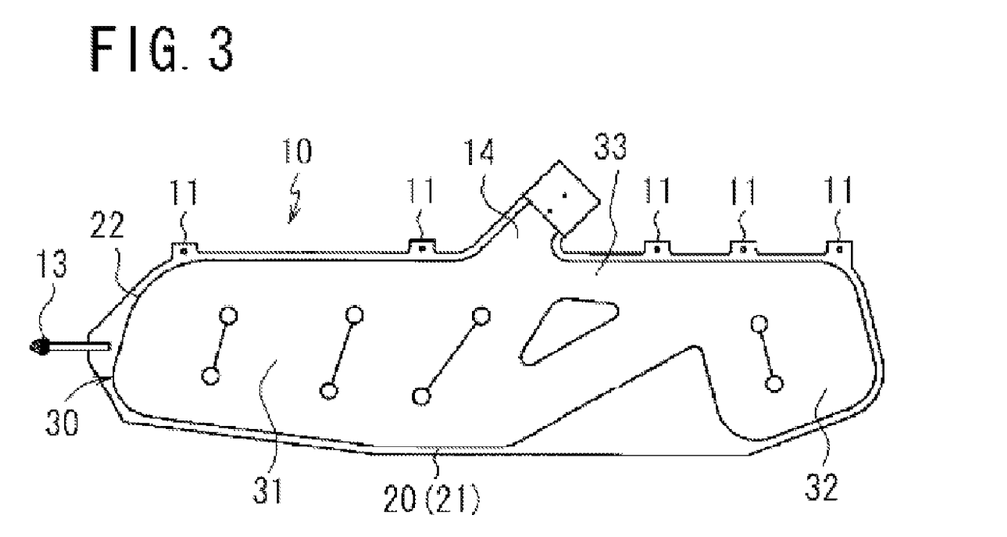
FIG. 3 is a schematic front view of a deployed airbag of the airbag device.

FIG. 3 is a schematic front view of the deployed airbag 10 of the airbag device 1 according to this embodiment.

More specifically, the airbag 10 is inflated and deployed between an occupant and the vehicle-body side wall etc., in the state shown in the figure, along the vehicle-body side wall including a side window in the vehicle so as to cover the entirety thereof.

Note that the airbag 10 has a substantially triangular projecting tab protruding toward the front of the vehicle, and a front mounting rod 13 to be fixed to a front pillar portion of the vehicle is provided at the front edge thereof.

The airbag 10 is formed by, for example, stacking a front base fabric piece 20 on the occupant side (on the vehicle interior side) and a back base fabric piece 21 on the vehicle exterior side, the base fabric pieces having the same shape, and joining the base fabric pieces 20 and 21, facing each other, along an outer-peripheral joining portion 22. The airbag 10 includes an inflating portion 30 (a front inflating portion 31 and a rear inflating portion 32) and a connecting portion 33 that extends along the upper edge of the airbag 10 and connects the inflating portions 31 and 32.

In this embodiment, the gas inlet portion 14 is provided above the front inflating portion 31 of the airbag 10 so as to communicate with the front inflating portion 31. The gas generated by the inflator 25 is introduced into the airbag 10 through this gas inlet portion 14 and is further guided to the inflating portion 30.

Next, the mounting brackets for mounting the airbag 10 to the vehicle body will be described.

Figure 4A:
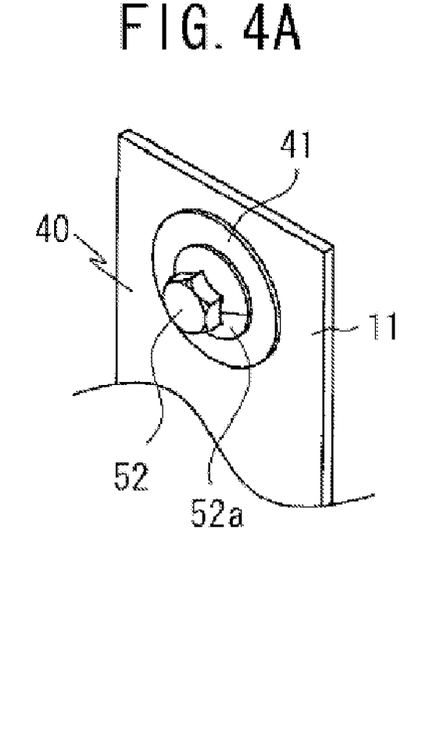
FIG. 4A is a perspective view of the mounting bracket according to this embodiment, as viewed from a vehicle interior side.
Figure 4B:
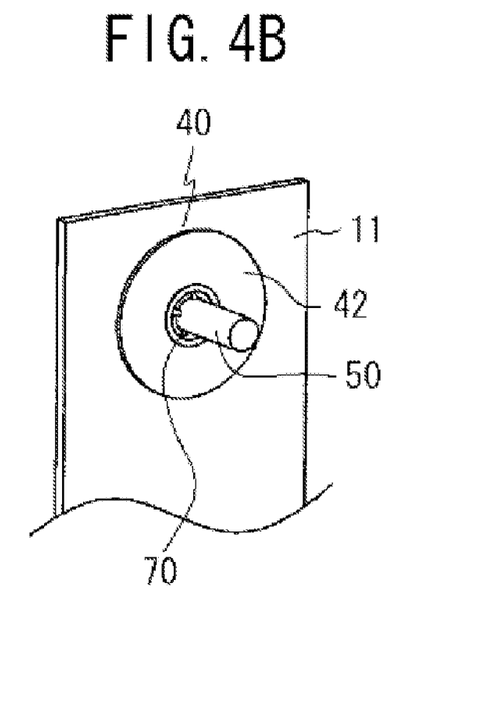
FIG. 4B is a perspective view of the mounting bracket, as viewed from a vehicle exterior side.
Figure 4C:
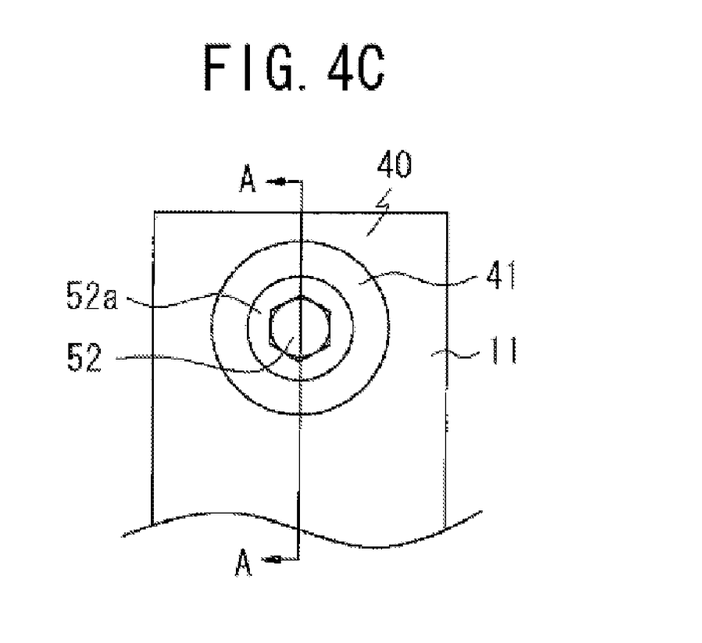
FIG. 4C is a front view.
Figure 4D:
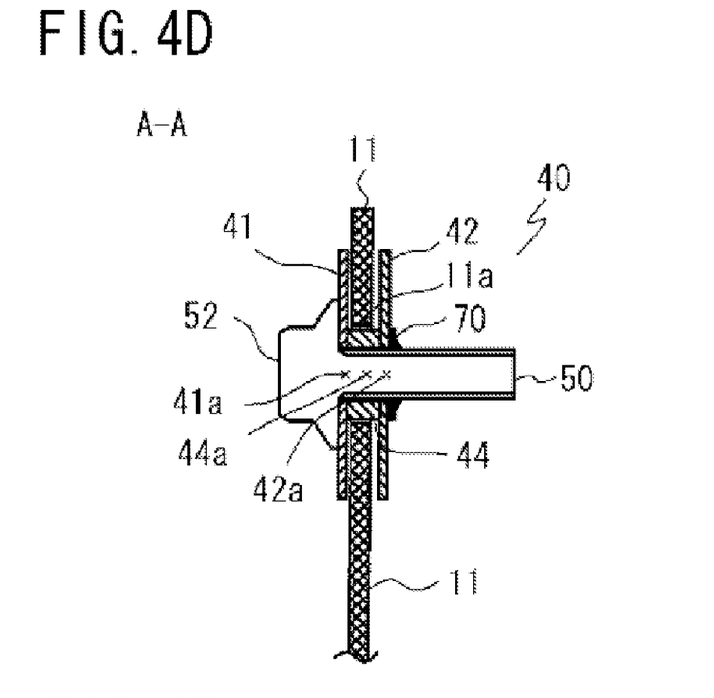
FIG. 4D is a cross-sectional view taken along line A-A in FIG. 4C.
Figure 4E:
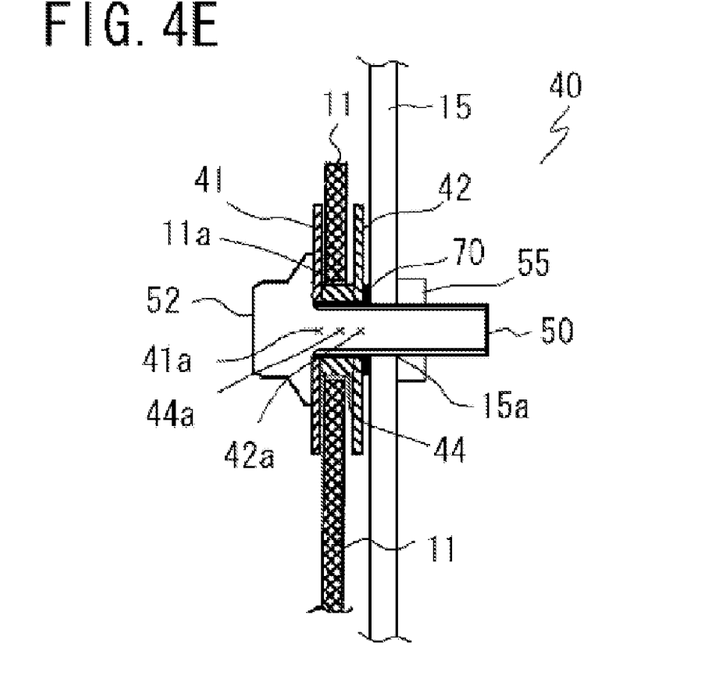
FIG. 4E is a cross-sectional view of the mounting bracket mounted to a vehicle-body side wall.

FIG. 4 shows a mounting bracket 40 according to an embodiment of the present invention, in which FIG. 4A is a perspective view of the mounting bracket 40 according to this embodiment, as viewed from the vehicle interior side, FIG. 4B is a perspective view of the mounting bracket 40, as viewed from the vehicle exterior side, FIG. 4C is a front view, FIG. 4D is a cross-sectional view taken along line A-A in FIG. 4C, and FIG. 4E is a cross-sectional view of the mounting bracket attached to the vehicle-body side wall.

This mounting bracket 40 is composed of a vehicle-interior-side plate (hereinbelow, an "inner plate") 41 and a vehicle-exterior-side plate (hereinbelow, an "outer plate") 42 that have a circular disc-like shape and are made of metal. The inner plate 41 and the outer plate 42 have, at the center thereof, insertion holes 41a and 42a, respectively, through which a bolt 50 passes (FIGS. 4D and 4E).

Furthermore, the inner plate 41 is provided with an annular member 44 having an inner hole 44a that communicates with the insertion hole 41a in the inner plate 41.

The annular member 44 is, in a state in which it is fitted into the insertion hole 11a in the mounting tab 11 of the airbag 10, that is, in a state in which the mounting tab 11 is externally fitted to the annular member 44, designed to have such a thickness as to be capable of determine the distance between the inner and outer plates 41 and 42, regardless of the thickness of the mounting tab 11, when the bolt 50 is inserted through the insertion holes 41a and 42a in the inner and outer plates 41 and 42 and the inner hole 44a in the annular member 44 and is fastened.

Accordingly, it is possible to obtain a feeling of contact without being subjected to a cushioning effect of the mounting tab 11 when the bolt 50 is fastened in order to mount the airbag 10 to the vehicle-body side wall 15 with the mounting bracket 40. Furthermore, it is possible to adjust the fastening torque of the bolt 50.

Note that the annular member 44 may be either formed integrally with the inner plate 41 or formed separately from the inner plate 41 and then integrated therewith by, for example, welding. Furthermore, the annular member 44 may be provided on the outer plate 42 instead of the inner plate 41, and the shape thereof is not limited to a circular ring-like shape (which is desirable though), but may be any barrel-like shape as long as it has the inner hole 44a, e.g., an oblong shape, a polygonal shape, or a rectangular column shape. Herein, they are generally called an "annular member".

Furthermore, although the insertion holes 41a and 42a in the inner and outer plates 41 and 42 and the inner hole 44a in the annular member 44 have such sizes that the bolt 50 can pass therethrough, for the ease of insertion, these holes are desirably, for example, elongated holes extending in the top-bottom direction.

Next, temporary attachment between the mounting bracket 40 and the airbag 10 will be described.

In order to temporarily attach the mounting bracket 40 and the mounting tab 11 of the airbag 10, first, the bolt 50 is inserted into the insertion hole 41a in the inner plate 41, next, the insertion hole 11a in the mounting tab 11 is externally fitted to the annular member 44 of the inner plate 41, and then, the bolt 50 is inserted into the insertion hole 42a in the outer plate 42. In this case, the bolt 50 is desirably inserted into the insertion hole 42a until a flange 52a of a bolt head 52 abuts against the inner plate 41.

Next, in this state, a toothed washer 70 (made of stainless steel and having a thickness of 0.25 mm, for example) is fitted to the bolt 50 from the outer plate 42 side.

By fitting the toothed washer 70 to the bolt 50 in this manner, it is possible to prevent the bolt 50 from coming off, and to temporarily attach the inner and outer plates 41 and 42 to the mounting tab 11, and hence, the airbag 10.

Furthermore, the annular member 44 does not have to be integrated with one of the inner and outer plates 41 and 42 when the annular member 44 is formed separately from the inner and outer plates 41 and 42. In this case, although the method of temporary attachment differs from that in the case where the annular member 44 is integrated with one of the inner and outer plates 41 and 42 in that, after the bolt 50 is inserted into the insertion hole 41a in the inner plate 41, the bolt 50 is inserted into the inner hole 44a in the annular member 44 to attach the annular member 44 to a vehicle-exterior-side surface of the inner plate 41, and the insertion hole 11a in the mounting tab 11 is externally fitted to the annular member 44, the other parts of the method are the same. Because they are not integrated, welding work etc. may be omitted.

Next, mounting of the temporarily attached mounting bracket 40 and airbag 10 to the vehicle-body side wall 15 will be described.

First, the bolt 50 projecting outward from the temporarily attached mounting bracket 40 is inserted through the insertion hole 15a in the vehicle-body side wall 15 and is aligned with a nut 55 fixed to the vehicle exterior side of the insertion hole 15a in the vehicle-body side wall 15. In this state, the bolt head 52 of the bolt 50 is rotated, and the bolt 50 is fastened to the nut 55. Thus, mounting of the mounting bracket 40 to the vehicle-body side wall 15 is completed.

According to this embodiment, because the mounting bracket 40 and the mounting tab 11 can be temporarily attached to each other with the bolt 50 being inserted therethrough, the temporarily attached mounting bracket 40 and airbag are not easily separated. Therefore, temporary attachment and mounting of the airbag 10 to the vehicle-body side wall 15 can be separately performed, and thus, it is possible to perform the temporary attachment prior to the mounting of the mounting bracket 40 to the vehicle-body side wall 15 and to store the temporarily attached mounting bracket 40 and airbag 10.

Furthermore, when mounting to the vehicle-body side wall 15 is performed, the airbag 10 can be mounted by simple work, that is, by simply inserting the bolt 50 into the insertion hole 15a in the vehicle-body side wall 15 and rotating the bolt head 52 of the bolt 50.

In this case, by rotating the bolt 50 several times by hand and screwing the bolt 50 into the nut 55 to such an extent that the bolt 50 does not come off from the nut 55, the mounting bracket 40 can be temporarily attached to the vehicle-body side wall with ease. With this configuration, it is possible to perform final tightening with tools, after the plurality of mounting brackets 40 are sequentially turned into a temporarily attached state, and the mounting condition of the entire airbag 10 is checked. Thus, it is possible to increase the working efficiency.

REFERENCE SIGNS LIST

1: airbag device,
10: airbag,
11: mounting tab,
11a: insertion hole,
14: gas inlet portion,
15: vehicle-body side wall,
15a: insertion hole,
20: front base fabric,
21: back base fabric,
25: inflator,
26: bracket,
30: inflating portion,
33: connecting portion,
40: mounting bracket,
41: inner plate,
42: outer plate,
41a, 42a: insertion hole,
44: annular member,
44a: inner hole,
50: bolt,
55: nut, and
70: toothed washer.

The invention claimed is:

1. An airbag device to be disposed at an upper part inside a vehicle, along a front-rear direction of the vehicle, the airbag device comprising:
   a plurality of mounting tabs that are provided on an airbag of the airbag device, each mounting tab having an insertion hole;
   a mounting bracket including inner and outer plates that have an insertion hole;
   an annular member that has a predetermined thickness and is to be disposed inside the insertion hole in the mounting tab; and
   a bolt and a nut, the bolt having a shaft portion penetrating through the inner hole in the annular member and the insertion hole in the inner and outer plates, the bolt serving to attach the mounting bracket to a vehicle-body side wall,
   wherein the bolt is fitted to a toothed washer for temporary attachment, the toothed washer temporarily attaching the bolt to the mounting bracket to which the mounting tab is fitted, and
   wherein the annular member restricts the distance between the inner and outer plates to the predetermined thickness when the airbag is mounted to the vehicle-body side wall.

2. The airbag device according to claim 1, wherein the inner hole and the insertion hole are formed in the shape of an elongated hole.

3. The airbag device according to claim 1, wherein the annular member is formed integrally with the mounting bracket.

4. The airbag device according to claim 1, wherein the annular member is formed separately from the mounting bracket.

5. The airbag device according to claim 1, wherein the annular member is a circular member.

* * * * *